Aug. 14, 1923.
E. A. VONDE VELD
1,464,893
DISPENSING APPARATUS
Filed Dec. 16, 1918
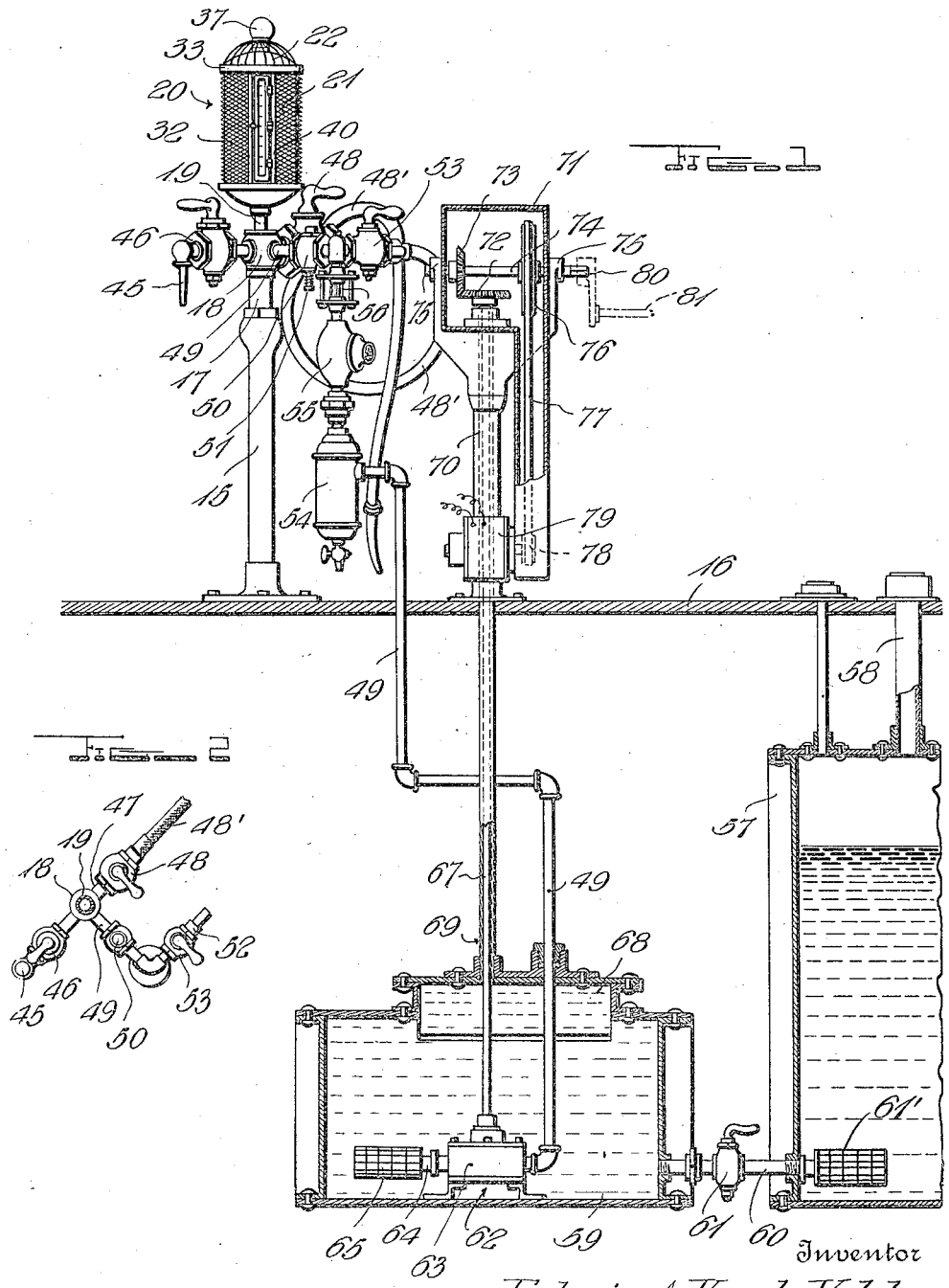
Inventor
Edwin A. Vonde Veld
By C. H. Parker
Attorney Patented Aug. 14, 1923.

1,464,893

UNITED STATES PATENT OFFICE.

EDWIN A. VONDE VELD, OF EL PASO, TEXAS.

DISPENSING APPARATUS.

Application filed December 16, 1918. Serial No. 266,867.

*To all whom it may concern:*

Be it known that I, EDWIN A. VONDE VELD, a citizen of the United States, residing at El Paso, in the county of El Paso and State of Texas, have invented certain new and useful Improvements in Dispensing Apparatus, of which the following is a specification.

My invention relates to improvements in dispensing apparatus, for discharging a liquid, such as gasoline or the like.

Important objects of the invention are to provide: means whereby a double acting pump may be employed to discharge the liquid from the storage tank to a desired point, or feed the liquid into the storage tank; means whereby the discharging liquid, passing in either direction, may be inspected; means whereby the purchaser of the liquid may observe the same in a transparent or translucent container, suitably graduated for indicating the volume of liquid thereby insuring the proper or full measure of liquid purchased; and a machine of the above mentioned character which is of simplified construction and highly convenient in use.

Other objects and advantages of the invention will be apparent during the course of the following description.

In the accompanying drawings forming a part of this specification and in which like numerals are employed to designate like parts throughout the same, Figure 1 is a side elevation of apparatus embodying my invention, parts being shown in vertical section, and Figure 2 is a plan view of the main coupling and associated elements.

In the drawings, wherein for the purpose of illustration is shown a preferred embodiment of my invention, the numeral 15 designates a vertical post or standard, suitably secured to a floor or foundation 16. A solid plug or coupling 17 is secured within the upper end of the post 15, and has connection with a coupling 18. This coupling is connected with a vertical pipe 19.

The numeral 20 designates an inspection measuring tank, vertically arranged above the standard 15, as shown. This tank 20 embodies a transparent preferably cylindrical body portion 21, arranged between upper and lower heads 22 and 23. The lower head 23 has a screw-threaded opening 25, receiving the upper end of the pipe 19.

In order that the transparent body portion 21, formed of glass or the like, may be protected from being broken, I surround the same with a protector 32, formed of an open wire fabric, having its opposite ends secured to upper and lower rings carried by the upper and lower heads.

I will now proceed to describe the several pipes or conduits connected with the coupling 18, together with their associated elements. Disposed upon one side of the coupling 18 is a draw-off pipe 45, equipped with a cut-off valve 46. This draw-off pipe is connected with the coupling 18 and a second outlet pipe 47 is connected with the opposite side of the coupling 18 and equipped with a cut-off valve 48. The pipe 47 has connection with a flexible hose 48', which may be employed to fill an automobile tank or the like. Connected with the coupling 18, between the pipes 45 and 47, is a main pipe 49, having a check valve 50 connected in the inner portion thereof. This check valve opens upwardly to permit of the gasoline or the like passing into the coupling 18, but normally prevents the passage of the gasoline or the like in an opposite direction, the valve of the check valve being adapted to be held open by the operator pressing upon a depending stem 51, whereby the gasoline may flow from the coupling 18 through the pipe 49. Connected with the pipe 49 outwardly of the check valve 50 is a filling pipe or connection 52, having a cut-off valve 53 connected therein. The main pipe 49 extends downwardly below the foundation 16 and has a filter 54, a meter 55 and a transparent inspection tube 56 connected in series therewith, as shown. The meter 55 is reversible and is operated by the fluid passing therethrough in opposite directions. The filter and meter may be of any well known or preferred construction.

Arranged beneath the floor foundation 16 is a storage tank 57, of any well known or preferred construction. This storage tank may be filled through a supply pipe 58, extending above the foundation 16, or by the operation of the reversible pump, to be described. The numeral 59 designates a supply tank, arranged beneath the foundation 16, and preferably near the storage tank 57. The supply tank 59 is connected with the storage tank 57 by means of a pipe 60 having a cut-off valve 61, connected therein. The intake end of the pipe 61 is preferably equipped with a strainer 61', of any well known or preferred type.

The supply tank 59 receives therein the reversible pump 62. This pump may be of any well known or preferred construction and is shown in detail in Figure 6. The pump is there shown as comprising a casing 63, having an inlet 64. This inlet, in Figure 1, is equipped with a strainer 65. The casing 63 has an outlet, connected with the pipe 49, as shown. Arranged within the casing 63 is a pair of intermeshing rotors 66, adapted to rotate in a horizontal plane, and which may be driven in either direction, causing the liquid to be discharged or drawn into the pipe 64, as may be desired. One rotor 66 has connection with a vertical drive shaft 67, for operating the same.

The supply tank 59 is equipped with a dome 68, through which the pipe 49 passes. This dome has connection with a tubular housing 69, rotatably receiving the drive shaft 67.

The drive shaft 67 extends upwardly beyond the foundation 16 and projects through a casing 70, bolted or otherwise rigidly secured to the foundation 16. At its upper end the casing 70 carries a box 71.

A bevel gear 72 is arranged within the box 71 and rigidly attached to the upper end of the drive shaft 67. The gear 72 engages a vertical gear 73, rigidly secured to a horizontal shaft 74, journaled through bearings 75. The horizontal shaft 74 has a pulley 76, engaged by a belt 77, extending downwardly to engage a pulley 78, which is secured to the armature shaft of a motor 79, the operation of which may be controlled by a suitably located switch. It is thus seen that when the motor 79 is operated the drive shaft 37 will be turned for operating the pump, in any desired direction. The horizontal shaft 74 has an extension 80, to receive a manually operated crank 81, whereby the apparatus may be manually operated.

The operation of the form of apparatus hereinbefore described is as follows:

With valves 46, 48 and 53 closed, the shaft 74 is rotated, to rotate the pump 62, whereby gasoline is supplied upwardly through the main pipe 49. This gasoline passes through the filter 54 to be treated thereby and through the meter 55, and through check valve 50 into the inspection tank 20. When the desired amount of gasoline is contained within the inspection tank, which may be readily observed, the pump is stopped. Should this tank contain more gasoline than required, a proper amount may be discharged therefrom and returned to the supply tank 59, by the operator manually opening the check valve. When the proper amount of gasoline is in the inspection tank, it may be withdrawn therefrom, by opening either valve 46 or 48.

When it is desired to fill the storage tank 57, valves 46 and 48 are closed, check valve 50 being closed, and the valve 53 is opened, and a suitable hose or the like connected with the pipe 52. The pump 62 is then driven in the opposite direction, the gasoline is fed downwardly through the pipe 49, passing through the meter 55 and filter 54. The gasoline will be discharged into the supply tank 59, and then pass into the tank 57.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

In a dispensing apparatus, a storage tank, an inspection tank, a coupling arranged adjacent said inspection tank, said coupling being open at the top and communicating with said inspection tank and being closed at the bottom, a supporting standard arranged beneath said coupling and secured thereto, a feed pipe connecting said coupling and said storage tank, a valved discharge pipe communicating with said coupling, a filling pipe connected to said feed pipe between said storage tank and said coupling, and a check valve arranged in said feed pipe between said coupling and said filling pipe.

In testimony whereof I affix my signature in presence of two witnesses.

EDWIN A. VONDE VELD.

Witnesses:
CHAS. H. VEALE,
C. M. WILCHAR.